Feb. 3, 1959   J. R. ULRICH   2,872,053
AUTOMATIC CARD FILE SYSTEM
Filed July 22, 1957   7 Sheets-Sheet 1

INVENTOR
JOSÉ RAFAEL ULRICH

ATTORNEY

Feb. 3, 1959  J. R. ULRICH  2,872,053
AUTOMATIC CARD FILE SYSTEM
Filed July 22, 1957  7 Sheets-Sheet 2
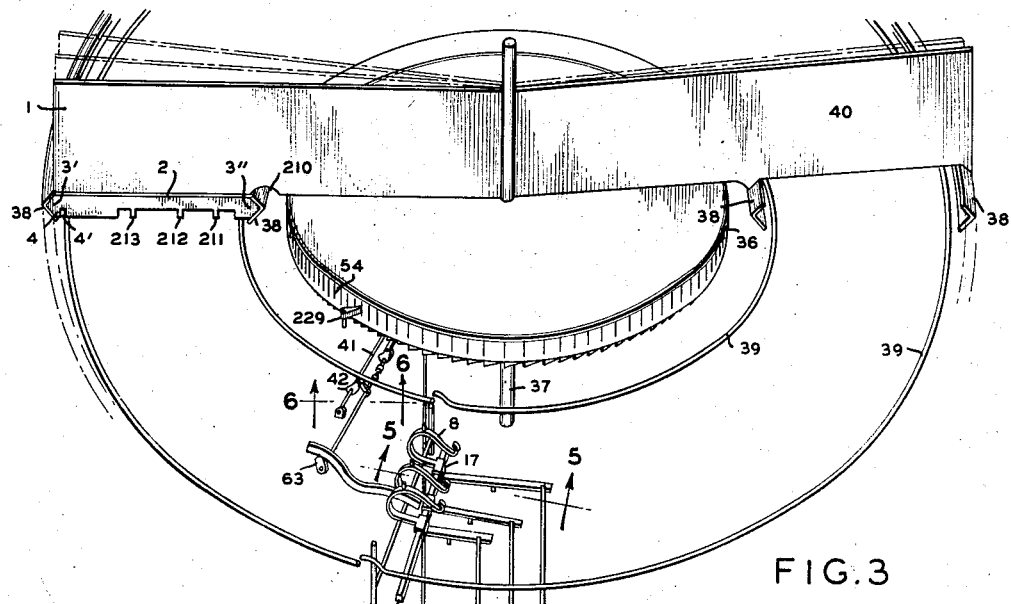
FIG. 3
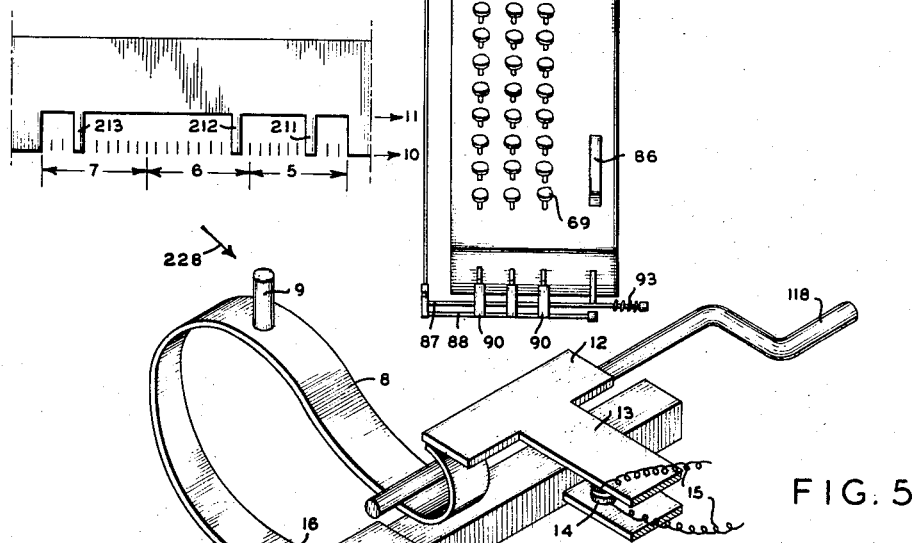
FIG. 4
FIG. 5
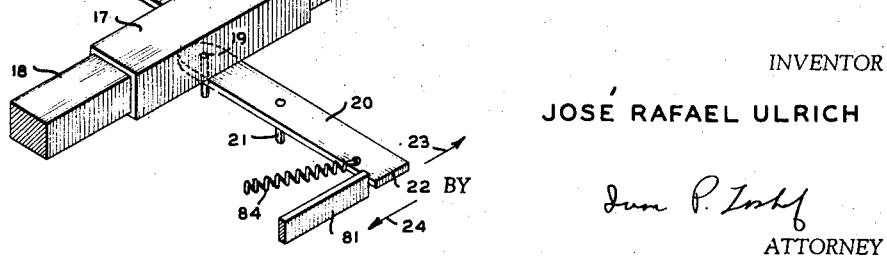
INVENTOR
JOSÉ RAFAEL ULRICH
ATTORNEY Feb. 3, 1959          J. R. ULRICH          2,872,053
AUTOMATIC CARD FILE SYSTEM
Filed July 22, 1957          7 Sheets-Sheet 3
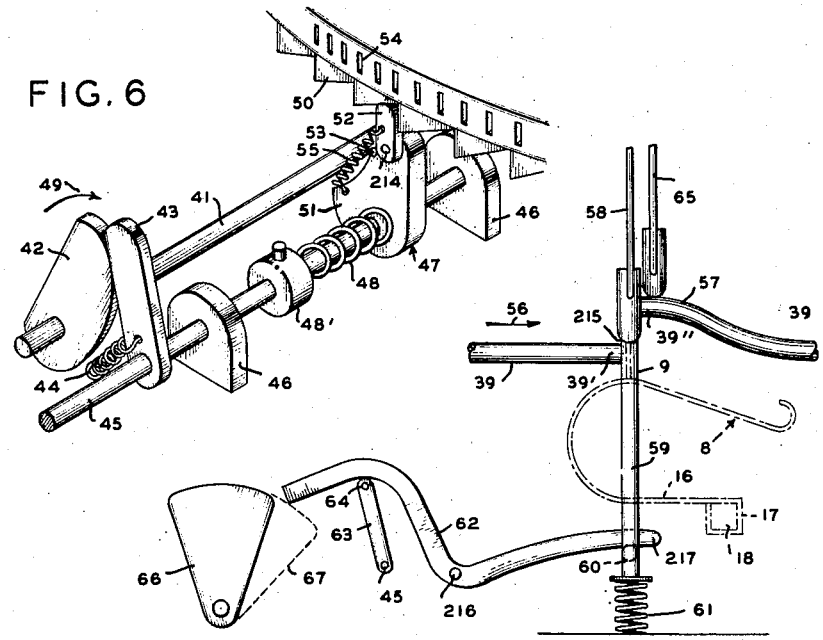
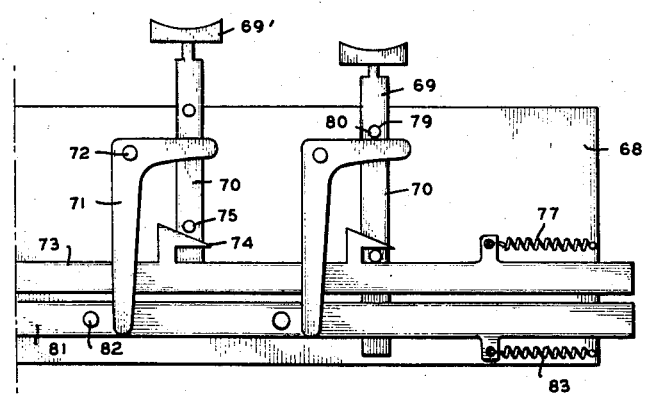
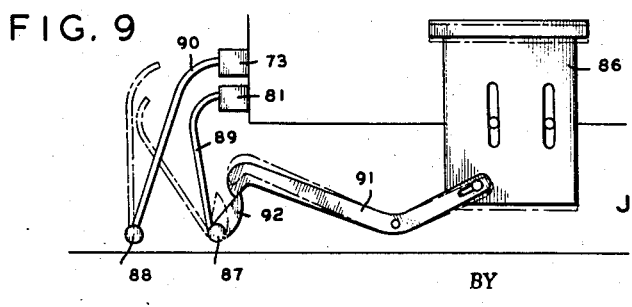
INVENTOR
JOSE RAFAEL ULRICH
BY
ATTORNEY Feb. 3, 1959  J. R. ULRICH  2,872,053
AUTOMATIC CARD FILE SYSTEM
Filed July 22, 1957  7 Sheets-Sheet 4
FIG. 10
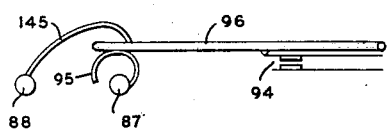
FIG. 11
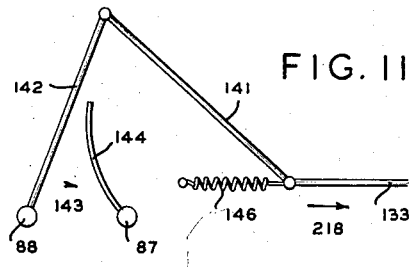
FIG. 12
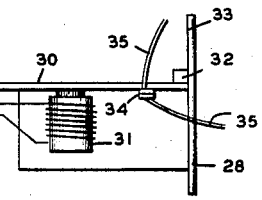
FIG. 13
FIG. 14
FIG. 15
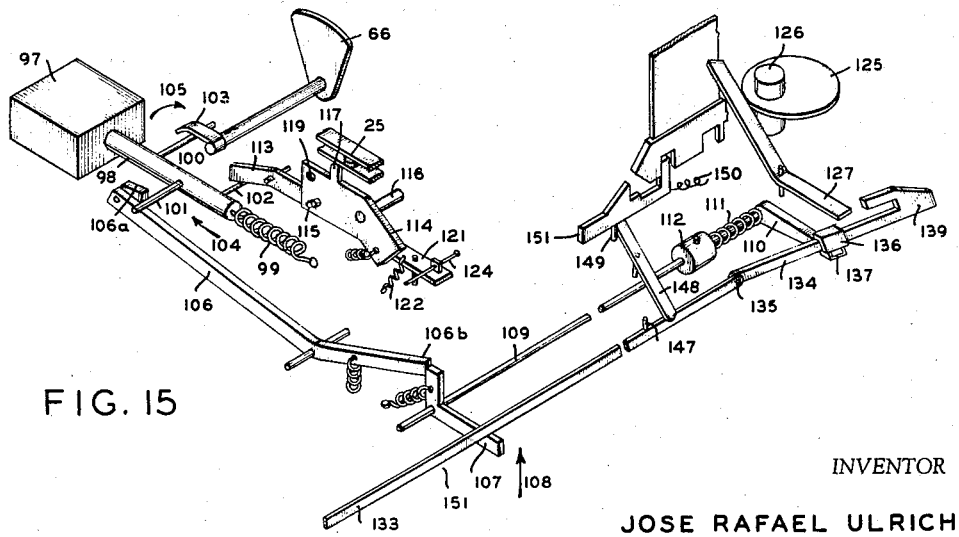
INVENTOR
JOSE RAFAEL ULRICH
BY
ATTORNEY

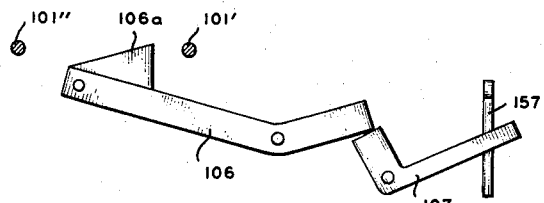
FIG. 16
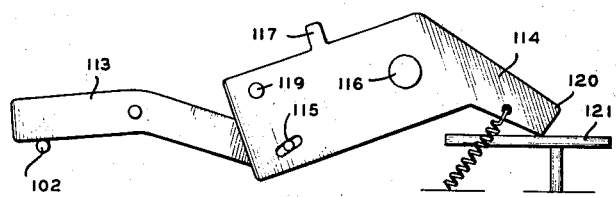
FIG. 17
FIG. 18
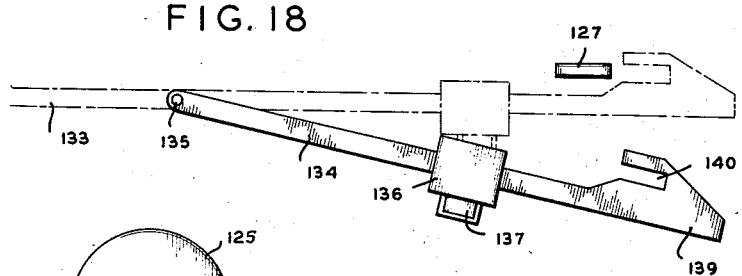
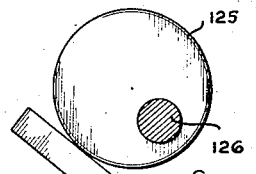
FIG. 19
FIG. 20
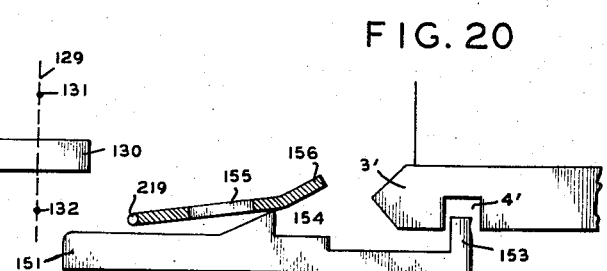
FIG. 21
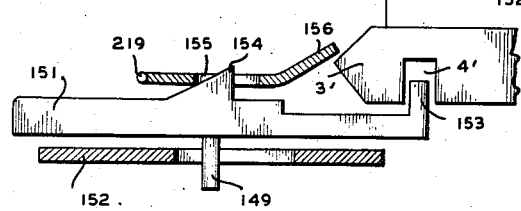
INVENTOR
JOSÉ RAFAEL ULRICH
BY
ATTORNEY

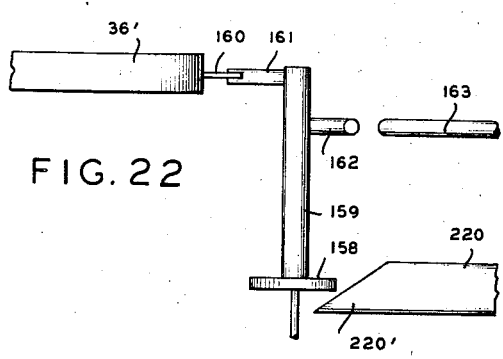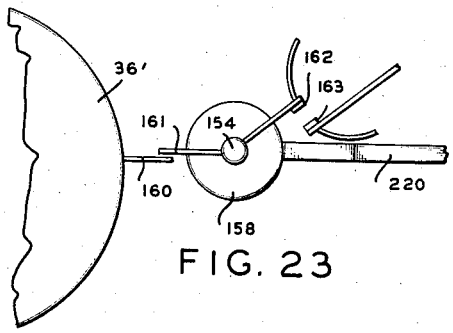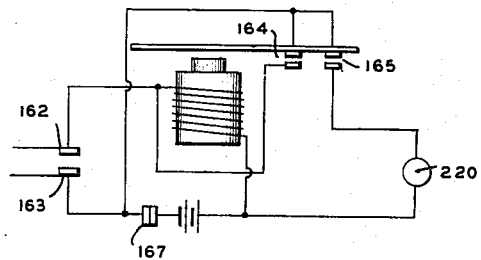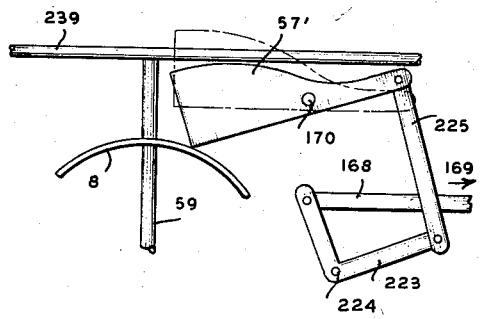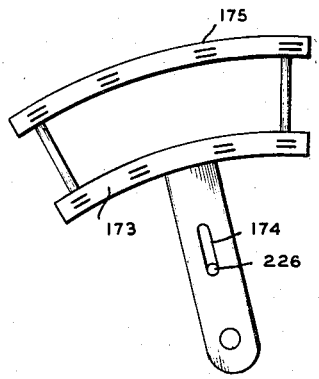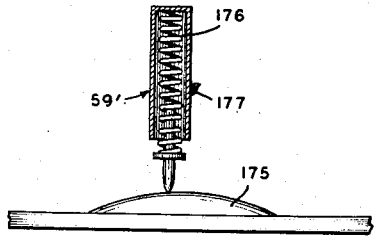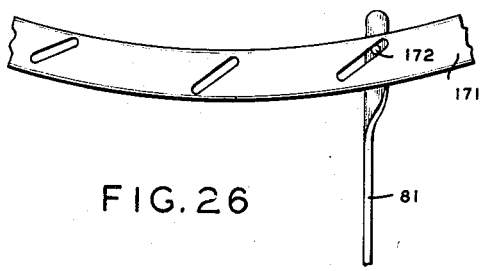

Feb. 3, 1959      J. R. ULRICH      2,872,053
AUTOMATIC CARD FILE SYSTEM

Filed July 22, 1957      7 Sheets-Sheet 7

INVENTOR
JOSÉ RAFAEL ULRICH

BY

ATTORNEY

United States Patent Office 2,872,053
Patented Feb. 3, 1959

2,872,053

AUTOMATIC CARD FILE SYSTEM

José Rafael Ulrich, Montevideo, Uruguay

Application July 22, 1957, Serial No. 673,412

34 Claims. (Cl. 214—11)

The present invention relates to an improved revolving file, and more particularly to one in which a number of cards, the number depending on the size of the cards and the size of the card index, are arranged vertically in a radial form on a disk which rotates about a vertical axis, the disk on turning bringing the various cards before the operator.

In the prior art, the cards are arranged in a suitable order, for example, alphabetically or numerically, to facilitate their selection. Once one of the cards has been selected, its place in the file is marked so that the card may be returned to its proper position. Usually, more than one card is removed at a time and this necessitates searching the markers to determine the position of the cards as they are returned to the file. These operations require a great deal of time and great care is required in returning the cards to the file since a mis-filed card is difficult to locate.

The present invention relates to a method of and apparatus for automatic card selection.

An object of the invention is to provide a system which will permit the cards to be placed in any order into the file and thereby eliminate the waste of time involved in selection and returning the cards to the file.

Another object of the invention is to provide a system which eliminates the possibility of mis-filing cards in a card file.

A further object of the invention is to provide an automatic card file for selection and extraction of coded cards radially arranged on an annular support having means to rotate said member relative to a sensing zone, sensing means for sensing a code means on a card in the sensing zone, selecting means to selectively adjust the sensing means to sense and recognize a preselected code in the code means of the card, and means for ejecting, from the file, a card having the preselected code.

A further object of the invention is to provide an automatic card file having means for sensing the code means on the cards, each card being individually sensed at a particular sensing zone.

A further object of the invention is to provide an automatic card file which includes means for lifting each card at a sensing zone from a low elevation to a higher elevation and returning the card to the lower elevation after it has passed the sensing zone, and including means for preventing lifting of a card at a sensing zone when the card carries the preselected code.

A further object of the invention is to provide an automatic card file wherein the sensing means includes an arcuate resilient means supporting a sensing member.

A further object of the invention is to provide a card which carries code means, the code means including a plurality of coding zones each zone having a tooth-like extension therein, the location of said extension in the zone determining the code of the card.

A further object of the invention is to provide an automatic card file having a plurality of sensing zones, a plurality of sensing means and a plurality of ejecting means.

A further object of the invention is to provide an automatic card file including means for rapid selection of a desired sector of the file.

A further object of the invention is to provide an automatic card file including means to stop the rotation of the file when all the cards in the file have been sensed and no card has been located which carries the preselected code.

These objects and other objects of the invention and the functioning of the system will be readily understood from the following description and the accompanying drawings. The drawings are diagrammatic and by way of example only.

Fig. 3 is a diagrammatic perspective view of the file showing the keyboard, the sensing means and the arrangement of the cards in the file.

Fig. 4 is a fragmentary plan view of a card showing the arrangement of the coding zones.

Fig. 5 is a fragmentary perspective view showing the detail of the sensing means taken on the line 5—5 of Fig. 3.

Fig. 6 is a fragmentary perspective view showing the detail of the means to rotate the disk taken on the line 6—6 of Fig. 3.

Fig. 7 is a diagrammatic sectional detail of the means to raise and lower the cards at the sensing zone.

Fig. 8 is a diagrammatic sectional detail of the operation of the keyboard.

Fig. 9 is a diagrammatic sectional detail of the operation of the control key.

Fig. 10 is a diagrammatic sectional detail of the switch controlled by the operating path.

Fig. 11 is a diagrammatic sectional detail of the mechanism which terminates the operation of the file and resets it for a new operation.

Figs. 12 through 14 are diagrams of the electrical circuit operated by the sensing means.

Figs. 13 through 19 are diagrammatic details of the electro-magnet and its associated structures.

Figs. 20 and 21 are diagrammatic sectional details of the extracting means.

Fig. 22 is a diagrammatic sectional detail of a modified structure for rapid selection.

Fig. 23 is a diagrammatic plan view of Fig. 22.

Fig. 24 is a circuit diagram of the modification shown in Figs. 22 and 23.

Fig. 25 is a diagrammatic sectional detail of a modification of the elevator system.

Figs. 26 through 28 are diagrammatic detail views of the modification of the elevator structure when plural sensing means are utilized.

Fig. 1 shows the exterior of the file of the invention showing particularly the slot 230 in the file for extracting the cards from the file.

Fig. 2 shows the general plan of the location of the major elements of the file, the various elements being discussed hereinafter.

Figure 1:
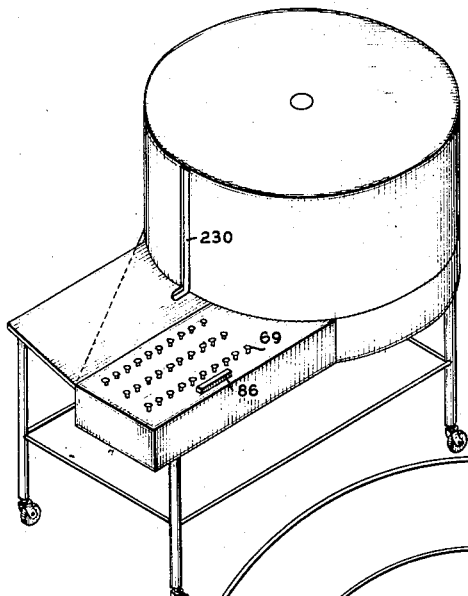
Fig. 1 is a perspective view of the card file.

In Fig. 3 there is illustrated one form of a card 1 which would be used in a system utilizing 1000 cards. The card is made of Bristol board or another suitable material and part of its lower edge has a rigid piece 2 preferably of metal whose ends 3' and 3" come to points, one of which (3') protrudes outwards slightly beyond the edge of the card and with an extension 4 downwards to form notch 4', while the inside point 3" remains in a cutaway section 210 of the card. Both end 3' and end 3" can have, if desired, such a thickness so as to force the cards, on being placed together, to adopt the radial arrangement that they will have to have on being placed in the file.

The bottom of the metal piece includes the coding means which are to be sensed by the sensing means when the machine is selecting a card. The bottom of the metal piece has three zones (5, 6, 7) as more clearly shown in Fig. 4. Each of these zones corresponds to a digit of a code number, for example, zone 5 corresponding to the units digit; zone 6, to the tens digit; and zone 7, to the hundreds digit. Each zone may be considered as being divided into ten parts. In each zone, corresponding to one of the ten parts therein is a metal tooth-like extension (211, 212, 213), corresponding to the code number. For example, if the card code is 427, there will be an extension (211) in the fourth position of zone 5, an extension (212) in the second position of zone 6, and an extension (213) in the seventh position of zone 7, as shown in Fig. 4.

Obviously, if using a system having a four digit code, there will be four zones, etc.

The working principle of the invention is based on the operation by means of those teeth, on the cards being displaced by turning the disk supporting them around its axis, of a series of contacts 14 that are arranged in such a way that, when all those that correspond to the card that is sought are closed, an ejector is released that automatically presents the card in question.

Said contacts (Figs. 3 and 5) are controlled by a sensing means such as the arcuate resilient member or spring 8, that is formed from a sheet of resilient material and suitably curved. Each spring has a sensing member or stud 9, in its upper level and arranged in a way to penetrate the zone determined by two horizontal planes, that are marked in the drawing with 10 which corresponds to the lower level of the teeth and 11 which corresponds to the body of the card (see Fig. 4). In this way if the stud 9 is placed in the particular path of a tooth, the latter will touch the stud and push it in the direction of its advance (arrow 228), and the spring 8 will be displaced downwardly. As the spring moves downwardly it will permit the arm 13 to descend and thereby close contact 14. The contact 14 is inserted in a circuit 15 whose composition and function we shall describe later. The other end 16 of the spring 8 is connected to a support 17, sliding on a guide 18 parallel to one of the radii of the disk of the file index, and suitably pivotally connected at 19 to a lever 20 which revolves around the bolt 21. Through the arrangement of this system the result is evident that if the end 22 of the lever is displaced in any of the two directions marked 23 or 24, the spring 8 and the stud 9 will be displaced in corresponding directions in the direction of the guide 18. It is possible to carry this out by means of a selection system which shall be explained hereinafter.

By means of the selection system it is possible to place the spring and its stud in the path of a determined tooth and the extreme positions of each assembly are those positions which are suitable to embrace one of the zones 5, 6 or 7 which have been described previously. The end 13 of the contact 14 is shaped in a way to cover all the possible positions of the spring, just as is seen in Fig. 5. It is immediately apparent from this that as many springs and studs would be necessary as the cards have zones of teeth.

Following along with the example already begun, if it is desired to take out or select card 724, by means of the selection system, the spring corresponding to the units is positioned so as to be placed in the path 4; the spring of the tens is positioned so that it will be placed in the path 2; the spring of the hundreds is positioned in the path 7; so that every time that a card passes those units, tens and hundreds coincide with those of the desired card, the corresponding spring will be inclined and will permit the closing of the contact that belongs to it. According to the case, the three contacts will remain open, if none of the three figures coincides; two contacts will remain open if one figure coincides and one contact will remain open if two figures coincide. All the contacts will be closed if the three figures coincide and only in that case, namely, when the card that is sought passes through the pulling out (extraction) position.

This is the time to explain, with reference to Fig. 12, the composition and purpose of the circuit 15 which has already been pointed out. It is composed of as many contacts 14 in series as there are springs set up for the selection, contacts which, as already stated, are usually open. Said circuit is completed by a contact 25, which is closed while the search for the correct card is carried on and while the three contacts 14 are not closed, by an adequate electricity supply source 27, and by a relay 26 which controls circuit 35 which actuates an electro-magnet (not shown in Figs. 12-14).

The relay (Figs. 13, 14) consists of the normal elements of a relay to which a resilient small plate 28 is added whose natural tendency is to bend in the direction marked by the arrow 29. On the lowering of arm 30 because of the coil 31 of the relay being activated, the arm stops acting on the stop 32 permitting the small plate 28 to move in order to place said stop 32 above said arm in the path of the arm, and thereby keeping the arm depressed until the small plate is forced in the opposite direction, for which it is provided with a suitable extension 33. When the arm is lowered, switch 34 is closed. That is to say, that once the contacts 14 are closed so as to activate the relay 26, the arm 30 is lowered, switch 34 is closed, and remains closed until the movable arm is released by moving extension 33 in a direction opposite that indicated by arrow 29, even when the circuit 15 is opened. During all this period of time the electro-magnet will remain activated by circuit 35 and the function of this electro-magnet will be hereinafter described.

It is evident that to make the springs operate so as to close the contacts and originate all the later operations, it is necessary to make the cards pass over the location of said spring. This is done in the following way:

The cards are arranged radially and according to vertical planes on a disk 36 or annular supporting member, set up horizontally and that can revolve around an axis 37. On this disk rests only the portion of the card which does not have the metallic piece 2. The metallic piece 2 rests on two concentric spaced rods 39 and is guided by points 3 which have already been referred to and which are fitted in two guides 38 which prevent undesirable side displacements. It is evident that the guides will have adequate cuts in the extraction point.

The movement of the cards is produced by the turning of this disk which for this purpose has a vertical plate 40 which is secured to the disk radially, Fig. 3. The turning of the disk is produced by operating a small electric motor (not shown) which communicates with the disk as shown in Figs. 3 and 6. When said motor turns, as will be noted later on, it communicates a rotary motion to a shaft 41 on which an eccentric 42 is rigidly positioned. On the periphery of that eccentric rests an arm 43 which is kept against the surface of said eccentric by means of a spring 44. The complete turn of the eccentric around the driving axle produces in the arm a reciprocating movement, since it can turn together with the shaft 45 of which the bearings 46 are the supports.

Connected with this latter shaft 45 and therefore bound to the arm 43 is another arm 47 which is jointed in its middle, with the connection between the arm and the shaft 45 being made through the tension of a spring 48. The presence of an adequate stop (not shown) will keep the arm 47 in the correct position.

When the direction of the turning of the shaft 45 is that indicated by the numeral 49, the arm 47 will push the disk through the rack 50 which is located in the lower part of the disk. The pressure which the arm exerts on the disk will depend exclusively on the tension of the spring 48, secured to shaft 45 by sleeve 48', because of which there will be safety from accidents because of an excessive stress being exerted.

In Fig. 6 there is a detail of the jointed arm 47, which shows in addition to a section of the shaft 45 and of spring 48, the body 51 of the arm, and a smaller arm 52, pivotally mounted on 51 at 214. Smaller arm 52 accompanies the body 51 of the arm in its turning in the direction 49 due to the relative position of the pivot 214 and the stop 52.

On the turning of the shaft 45 in the direction contrary to that indicated at 49, the disk is prevented from going backwards by means of a pawl 229 which operates in the notches 54 made in the periphery of the disk. Since the arm 52 lags with respect to this reverse displacement of the body 51, for the spring 55 hasn't sufficient strength to maintain 52 against the stop 53, the arm 47 will act as a release pawl on the turning being produced in this direction. The pressure exerted by the arm 47 on the disk 36 and regulated by the tension of the spring 48, is communicated to the stack of cards by means of the vertical plate 40 which has already been described and shown. In this way the cards are raised within reach of the selector. We should now describe the device which permits one card at a time to be presented to the selector, without risk of mistakes motivated by the incontrollable passing of the cards through the critical or sensing zone.

Fig. 7 shows the device which avoids such a risk. This figure includes a fragmentary side view of the selecting spring 8 which has already been described, to which is secured stud 9. The metallic parts of the card, supported by the rods 39, advance under the pressure of the plate 40 (not shown in this figure) which is exerted in the direction marked with the numeral 56. The rods are continuous except at critical point 215. At this point there is a gap between the ends of the rods 39' and 39", and 39" being at a higher level than 39'. When a card reaches said gap, it is stopped by the ends of rods 39" which have an elevation 57 above the level in which the normal part of the rods is developed; that is, the position occupied by the card marked 58. In other words, these rods or supporting members, are displaced from their normal plane at the sensing point and for a short distance thereafter. This displacement provides means for stopping the cards at the sensing zone as just described.

Coincident with that position the device presents two vertical bars 59 joined by a horizontal rod 60 indicated by dotted lines in the drawing. This H-shaped piece has an alternating up-and-down motion which is controlled in its ascent by the action of single springs 61 in each one of the bars 59 and in its descent by a lever 62 pivoted at 216, which acts on rod 60. The lever 62 is moved by an arm 63 secured to the shaft 45 and moved by the alternating motion of shaft 45 as described in connection with Figs. 3 and 6. Arm 63 is shown in Fig. 3.

The functioning of the assembly from the lowest point of the motion of the bars 59 will now be explained. At that point the corresponding end 217 of the lever 62 is also in the lowest point, for the end 64 of the arm 63 has reached its highest point in its alternative motion. Starting from that moment the displacement of the arm causes its end 64 to descend because of which the action of the springs 61 will lift the bars 59 which will push the card held in the cap until its lower part succeeds in going above the ends 39" of the rods in their position 57.

At that moment the pressure of the plate 40 causes the card marked 58 to be displaced, in turn pushing the card that was then on the raised rods 57 and which is indicated at 65. This card on being displaced will slide through the inclined plane determined by the rods at elevation 57 until reaching again the normal level. It is on reaching the position 58 that the cards pass to the critical point and drive, if corresponding, the springs 8. After the bars 59 have reached their position of highest elevation, reversal of the turning of the shaft 45 will begin to actuate the lever 62 which will then push bars 59 downward. That is, the shaft 45 will operate the lifting system and will pass a card over the critical point at each complete turn of the eccentric marked 42 in Fig. 7 is shown a keeper 66 which on turning until getting into the position 67 will keep the lifting system in its lowest point. The turning of the keeper, which will be described hereinafter, depends on the complete closing of the circuit 15 and the consequent action of the electromagnet.

The fundamental characteristics and operation of the basic parts of the invention have been described. The complete operation of the apparatus will now be described, setting forth where appropriate the characteristics of the accessories which make possible functioning of the apparatus and which for purposes of greater clarity have been omitted until now.

The description will start from the time when the file is full of cards and it is desired to select one. There already has been mentioned as the selection system a device which permits the operation to communicate to the equipment the card that it is desired to be pulled out. This device will now be described.

Figure 2:
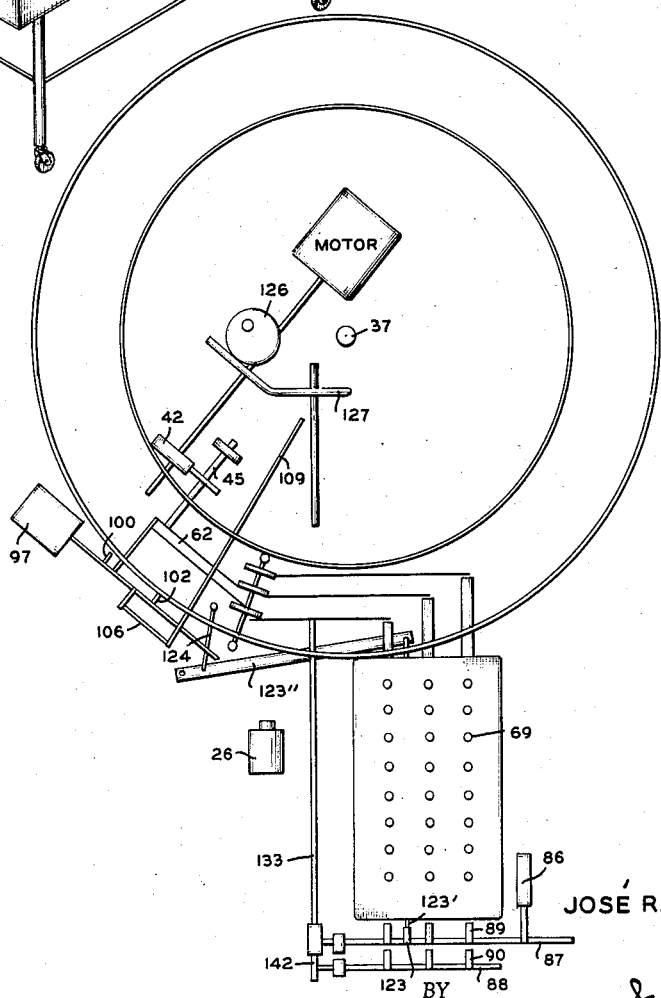
Fig. 2 is a diagrammatic plan view showing the general location of the various elements which comprise the file.

On the outside (see Figs. 2, 3) the selection system is formed by an assembly of keys 69 like an adding machine, that are arranged in columns; each column includes 9 keys in order from 1 to 9. Located conveniently, an operation bar 86 complements the keyboard. In order to determine what card the device is to select, as many keys must be pressed as are provided zones in the cards. Continuing the example, the file that is to be used would have three columns of keys, and to select a card coded 724, it is necessary to press the keys 7, 2, 4, in the columns of the hundreds, tens and units respectively. After this has been done, it will suffice to press the operation-bar in order that the device will pull out the desired card.

The keyboard and the way that the corresponding figure is communicated to the selecting apparatus will be first described. Each column forms a whole that is supported by a plate 68 in Fig. 8. On this plate the nine keys 69 are arranged in such a way that they can be displaced together with their respective stems 70 along the longitudinal axis of the stems. Each key has a spring (not shown in the figure) that tends to bring it to its inactive position (69'). Each key acts in combination with an L-shaped lever 71 which is capable of turning around a pivot 72 which is located in the zone of the angle. The system is complemented by two bars 73 and 81 which, perpendicular to the axis of the stems of the keys, embrace the entire width of the support plate and extend suitably beyond its edges. One of these bars 73 which is designated as a fastening bar, has some hooks 74 which are arranged in such a way that each one corresponds to a key and its stem and they intervene in the descent of the stud 75, integral with each stem.

The function of the fastening bar is the following: On the key's pushing the stem, by means of the stud 75, it will exert an action that will push the fastening bar along its longitudinal axis because of the inclined plane arrangement of the contact zone of the stud 75, and the hook 74. On the bar being displaced because of that action, the hook will withdraw from the path of the stud, because of which the key will be able to be pushed as far as the limiting position. At that time the fastening bar stops receiving the indicated push and being forced by the spring 77 returns to its initial position and maintains the key that was pressed in its operating position. The result is obvious that because of that arrangement if by mistake the wrong key is pressed, it will suffice to press the correct one so that the former can be released and the latter is held.

Each key has in its stem a second stud 79 which does not work when the key is not kept in its pressed position, but in the pressed position it limits the displacement of the L-shaped lever which has already been mentioned, as can be seen at 80.

The other bar 81, designated a control bar, has a stud 82 for each set of key and lever, and can be displaced along its longitudinal axis, which is parallel to that of the fastening bar. As urged by the spring 83, the control bar will be displaced in the direction of the spring, making the studs touch the respective L-shaped levers which will be passed, except when a key is in its pressed position. However, when a key is in its pressed position, the stud 79 will prevent rotation of the lever and consequently the lever will stop the control bar in a position pre-fixed by the operation of the key.

As previously stated, only nine keys are used, numbered from 1 to 9; the number zero is obtained by the extreme position of the control bar which, if no key has been pressed, the bar may freely reach.

It is pointed out that the selection springs 8 were located in a correct position, in order that the respective studs 9 be placed in the path of the tooth of the desired card, by means of operating the lever marked 20. It is upon that lever 20 that the corresponding control bar 81 operates as shown in Fig. 5. The displacement of the end 22 of the lever 20 is determined in the direction 23 by the push of the control bar 81 and in the direction 24 by the action of the spring 84.

The required position of the spring 8 on the support bar 18 is determined by the position of the studs 82 together with the appropriate angle of the part 71 on the control bar so that its position can allow the stud 9 to be placed in the path of the desired number when the corresponding key in the selector is pressed. Once the desired keys have been pressed, the next operation is to press the operating bar, as described below.

Arranged in front of the columns and along a direction perpendicular to the plate which supports the selection system, are two shafts 87 and 88 (see Figs. 2, 3, 8, 9, 10, 11). Each one of these shafts has in front of each of the columns an arm respectively marked 89 and 90. The arms 89 are arranged so as to push in their motion the control bars 81 of the respective selecting columns; the arms 90 in turn perform an equal function with the respective fastening bars 73.

After having pressed the selective keys, the operating bar is ready to be pressed. At that time (solid lines, Fig. 9) the arm 89 is pressing the control bars, and is kept in this position by the hooking of the lever 91 in the keeper 92 which is rigidly fastened to, or integral with, the shaft 87. Said hooking keeps the shaft from rotating in spite of the pressure which is exerted on it by the control bars which are forced by their respective springs 83 and in spite of the action of the spring 93 which tends to rotate bar 87 in the same direction. On pressing the operating bar 86 keeper 92 releases from lever 91, thereby permitting shaft 87 to rotate (dotted lines, Fig. 9). This releases arms 89 from their action on the control bars 81 and the control bars are displaced under the action of the respective springs 83 in accordance with the selecting keys which have been pressed.

In its rotation the shaft 87 also determines the starting of the motor which provides the mechanical force which is necessary for the operation. This starting is produced because of the closing of the switch 94 (Fig. 10) which is kept open by the pressure which the spring 95 exerted on the lever 96, to which is attached one of the contacts of said switch 94. On the turning of the shaft 87 it moves the spring 95 which permits in this way the descent of the lever 96 and the consequent closing of the switch. The motor, on being started, determines the feeding of the cards to the critical, or sensing, point as already described.

Once the correct card has reached the critical point, the circuit 15 closes as was already explained. Because of the closing of said circuit, the electro-magnet 97 (Fig. 15) is energized which determines the pull and consequent motion of the bar 98 against the action of the spring 99. The bar 98 has mounted thereon three studs which perform the functions described hereinafter.

On describing the passing of the cards through the critical point, the keeper 66 was referred to, which on turning until coming to the position 67 will keep the card lifting system at its lowest point. This turning is obtained by means of the stud 100 which acts on a lever 103 when the bar 98 is displaced in the direction 104. Because of the shape of the lever 103 its displacement will be produced in direction 105 and the consequent displacement of the keeper 66 to position 67.

Another of the functions performed by the electro-magnet is the function carried out by the stud 101. On being moved by the bar 98 in the direction 104, it pushes downward the lever 106 which on turning under the action releases the end 106b which acts as a stop to prevent rotation of lever 107. Because of the action of suitable springs, lever 107 has the tendency to rotate in the direction marked 108 moving in its rotation the shaft 109 and the arm 110. The union of the arm 110 with the axle 109 is brought about by means of a spring 111 which is joined to the arm and fixed to the shaft by sleeve 112.

This spring mounting permits the arm 110, when obstructed in its movement, not to interfere with the rotation of shaft 109. In other words, arm 110 revolves rearward relative to the shaft when the arm is obstructed by an impediment in its path.

Lever 106 has pivotally secured to it arm 106a which is kept in the raised position by a spring (not shown). When stud 101 moves from position 101' to 101" (Fig. 16), lever 106 will be displaced to permit lever 107 to assume the position shown in Fig. 16. When stud 101 moves from position 101" to 101' it will merely displace arm 106a without effecting the movement of the lever 106.

The last of the functions which the electro-magnet performs is done through the stud 102 (Figs. 15 and 17) which rests on lever 113 which is connected to the part 114 by means of a variable connection 115. The part 114 can revolve around the axle 116 which it does under the action of the stud 102 when the stud is displaced in the direction 104 passing the elements from the position represented in Fig. 15 to that which corresponds in Fig. 17.

On doing it in this way, the support 117 will withdraw from the switch 25 which acts as the general switch in the circuit 15 (see Fig. 12) which is closed by the contacts 14 when the correct card acts on the studs 9 of the springs 8, this contact 25 being closed while the selection is being carried out. At the same time and also due to the turning of the part 114, the bar 118 (Fig. 5) whose end 119 is seen in Figs. 15 and 17, will go down and will keep down the free end 12 of the spring 8 and for the same reason the corresponding contacts 14 closed. The reason for this last operation is to withdraw from the central zone the studs 9 in the later operations, since unsuitable hookings could be produced. On the contacts 14 being closed, the relay will also remain closed after having performed its function due to the hooking of the small plate 28; cutting the exciter circuit of the relay is the function which the switch 25 performs on the withdrawing of the support 117 from it.

In the turning of the part 114 the raising of the butt 120 is effected thereby releasing the part 121 which turns in a plane perpendicular to the plane of 114, drawn by a spring 122 until it is placed under the butt 120 and therefore prevents the part 114 from resuming its original position, until 121 is withdrawn, even when the stud 102 returns to its initial position.

The part 121 only withdraws on being operated by a new operation when the bar 86 is pressed, since the shaft 87 has attached thereto lever 123 (Fig. 2) which is joined to the part 121 by means of arms 123', 123'' and arm 124. The union between the part 121 and the arm 124 is not rigid, but acts on the last portion of the path of the latter. When shaft 87 is released and rotates part 121 will be withdrawn, allowing the lever 114 to return to its original position and consequently being placed in a position to actuate the springs 8 and the circuit 15 when the bar 118 is raised and the switch 25 is closed.

Mechanisms of termination and closing of an operative cycle will now be explained.

Driven by the same generator motor of the mechanical power that has been already mentioned and which begins its functioning on the closing of the contact 94 (Fig. 10), is an eccentric 125 (see Figs. 15, 19) whose rotatable shaft 126 operates parallel to the shaft 37 of disk 36 which is the card carrier. The object of this eccentric is to make the lever 127 move in a reciprocating way under the action of the eccentric combined with that of the spring 128. This lever 127 which moves along a plane perpendicular to the shafts 37 and 126, which have already been mentioned, traverses in its movement a vertical plane 129 (Fig. 19) and which is the plane in which Fig. 18 has been represented, reaching in its displacement the extreme positions of its forward edge 130, the positions being marked 131 and 132.

A bar 133 is reciprocally positioned in plane 129 with its axis horizontal. This bar 133 has at one end a movable section 134, jointed at 135, so that it can revolve around said joint, but always maintaining itself in the plane 129. Its position is determined by the arm 110 whose movement as effected by shaft 109 parallel to bar 133, has already been described in connection with the various functions of the electro-magnet. This arm 110 acts on the support 136 of the movable section 134 through the groove 137. Support 136 is slidably mounted on section 134. When shaft 109 is in its position of rest, the end of the arm 110 which fits in the groove 137 will be at its lowest point, because of which the end 139 of the section 134 will remain below the zone in which the lever 127 moves.

As soon as the electro-magnet acts because the desired card has been found, rotation of the shaft 109 will be effected and arm 110 will raise the end 139 of the movable section 134 as can be seen by the dotted lines of Fig. 18. This will position end 139 in the zone embraced by the movement of the lever 127 in its intersection with the plane 129. As a result of this, the first time that said lever effects its travel from 132 to 131, lever 127 will engage slot 140 in the section 134. The immediate result will be moving of the bar 133 to the right.

The bar 133 is what performs in its displacement all the functions of terminating the operation and the resetting of the equipment for a new operation as will now be described.

Pivotally joined to the end of the bar 133 opposite end 139 is one end of rod 141 (see Fig. 11). The other end of rod 141 is pivotally joined to the arm of lever 142 which is rigidly attached to the shaft 88. As a result of this, movement of the bar 133 in the direction of arrow 218 will cause shaft 88 to rotate in the direction marked 143. This causes arms 90 which have already been described, to press down the ends of the fastening bars which thereby release the keys and efface the code of the previous card selection.

In addition, in this motion the lever 142 acts on the arm 144 which is integral with the shaft 87 causing it to turn until the lever 91, which is also integral with shaft 87, is once again held by the keeper 92. In this position of the shaft 87 the arms 89 are pressing the control bars.

Another function of this movement is that exerted by the arm 145 which is integral with the shaft 88. As soon as the shaft 88 is displaced from the position of rest, arm 145 begins to exert pressure on the lever 96 which keeps the switch 94 closed by overcoming the tension of the spring 95, which spring on being moved by the shaft 87 opens said switch. This guarantees that mechanical energy will be available the entire time that the lever 127 moves the bar 133.

As soon as the lever 127 reverses the direction of the movement under the action of the eccentric 125 and the spring 128, the bar 133 will recover the position of rest required by the spring 146. Rod 141 will act on the lever 142 and the lever and shaft 88 will return to their initial position, thereby releasing in the last fraction of rotation of said shaft the pressure of the arm 145 on the lever 96. This release of pressure permits the opening of the switch 94 and the stopping of the motor.

Another function which is performed by the bar 133 in its movement is now described. On the bar 133 there is a stud 147 (Fig. 15) which, when bar 133 moves, rotates lever 148 which in turn moves extractor 151 by means of stud 149, secured to the extractor (see Figs. 15, 20, 21). Extractor 151 is slidably mounted in a guide, which guide has a suitable slot for stud 149 to pass through. The extractor 151 has on its end a hook 153 which fits into a notch 4' which is made in the metallic part 2 of the cards on the outside end 3'. The location of the extractor is such that its hook 153 hooks onto the selected card when it reaches the critical point. On being drawn outwards by the action of the lever 148 on the stud 149, the part 151 moves the desired card, placing it in the reach of the operator. The cover of the file has a suitable slot 230 through which the card is removed.

As the extractor moves outward, a triangular projection 154 hooks into the slot 155 in catch 156 pivotally mounted as at 219, which prevents, on the action of the lever 148 stopping because of the reciprocating motion of the bar 133 having come to an end, the part 151 from returning inwards under the action of spring 150 against which the first movement is effected. As seen in Fig. 21, the arrangement of the catch 156 is such that the end 3' of the card which has already been pulled remains under the catch and on removing the card from the file, the catch will be raised, which will allow the extractor part to return to its original position.

Another action which the bar 133 performs is the resetting of the original position of the shaft 109 by action of a triangular part 157 affixed to said bar 133 as can be seen in Figs. 15, 16. The triangular part 157, on being displaced, acts on the end of the lever 107 making it descend and allowing the end 106 of the lever to be reestablished on lever 107. It is recalled that the other arm which is joined to the shaft 109, namely the arm 110, does not necessarily have to accompany the shaft in its movement if there is any impediment in the path of arm 110 because it is mounted by means of the spring 111 which allows it to lag.

The last action of the bar 133 while it is being moved consists in opening the contact 34 of the relay 26 by means of the pushing of the rod-like extension 33 of plate 28 in the direction opposite to that marked 29 which permits the unhooking of the arm 30 which was held by the stop 32 solid with 33. On the contact 34 being opened, the excitation of the electro-magnet stops because of which the bar 98 will withdraw under the action of the spring 99. This action, which is the last to be carried out, is what required the provision of the arm 106a for otherwise the stud 101 could not be able to pass from position 101″ to 101′ without moving the lever 106 that was previously re-set (Fig. 15).

Another point to be explained is that the part 114 cannot return to the starting position because when shaft 87 returns to its position, the part 121 interposes itself under the end 120 of the part 114 and part 121 will not withdraw until the operating bar is pressed in a new operation.

After a card has been used, it will be returned to the file case by inserting it in a slot provided for that purpose in both the cover as well as the guides 38. These guides, in order to facilitate the placing back of the card, will be widened so as to channelize the ends 3′ and 3″ of the metallic base of the card to the proper position.

This is the description and functioning of one of the preferred models of the invention. Obviously, mechanical points of great importance in the functioning of the devices which have been indicated have not been illustrated, but they do form no part of the invention and they do not constitute a novelty in the problems of the invention. This has reference to such standard mechanical structures as bearings, guides, springs, transmissions of mechanical movement, substitution of contacts which have been shown on the diagram by systems of switches controlled by relay, etc., each of which are necessary for correct functioning of the system but which, if included in the specification and drawings would unduly complicate them without providing significant advantage in explaining the invention.

The basic devices described above may be caused to operate more efficiently by the addition of accessory elements or modifications.

The first modification has reference to using a four digit code instead of a three digit code. Obviously, the only limitation on the size of the code is the size of the file and the time spent in an average operation. However, this time can be reduced.

By way of example, it is assumed that a file of 10,000 cards arranged between 0000 and 9999 is desired. This involves a system of four figures, in which the application of the system would require an excessive amount of time which arbitrarily is set at ten minutes for the purpose of this explanation. The result is obvious that this period of time is excessive and that the system would stop being useful.

In this modification, there is added a fourth row of selector keys which would control a new control bar 220 (see Figs. 22, 23). This bar is beveled at the end 220′. That control bar, by means of the support 158 locates the vertical location of the part 159 which will be selector of the fourth figure. This selection comes about in the following way: on the edge of the disk 36′ at different heights studs 160 are placed, each one of which corresponds to one of the thousands and is placed in a way so as to come in front of part 159 when the sector in which are the cards corresponding to that thousand approaches the critical zone of the selector 8. The part 159 has an arm 161 perpendicular to its rotation axis which will be touched at that critical time by the appropriate stud 160. Stud 160 will start the turning of the part 159 and the consequent closing of the switch of contacts 162 and 163.

This switch energizes a double contact relay (see Fig. 24), one 164 which will keep the relay energized throughout the entire duration of the operation and another 165 which will feed the circuit 166 to an electro-magnet 220. The purpose of this electro-magnet is to delay or impede all those actions that could interfere with the quick placing of the disk 36 and consequently with the cards in the desired position. For this it will be necessary that, after marking on the selector keyboard the figures of the card to be pulled out, the operating bar only puts into operation the starting motor. Additionally, the gap in rods 39 (Figs. 3, 7), with the resulting higher elevation 57 will be eliminated. Instead will be substituted continuous rods 239 and a new part 57′ (see Fig. 25); this new part is connected by means of a system of bars and levers to the electro-magnet 222 which, on being excited, will attract the bar 168 in the direction indicated by the numeral 169. This will rotate lever 223 around pivot 224, which will draw arm 225 downward and arm 225 will turn the part 57′ around the pivot 170, a turning which will place it in operating position as shown by the dotted lines of Fig. 25. Another variant to the previous system is the necessary of avoiding the up-and-down movement of the elevator 59. This is accomplished very easily through the action of the electro-magnet 222 which will control a stud similar to 100 and which will keep the elevator in its lower position until it is withdrawn through the operation of said electro-magnet.

Besides the indicated variants of the original system, it will be necessary, on reaching the starting position of the operation within the sector corresponding to the thousands of the cards, that the electro-magnet stop the motor and start the normal working action by actuating the movement of the lever 91 which obviously will have to be separated from the bar 86.

On observing the electric diagram of Fig. 24, it is seen that once the initial contact of the switch 162 and 163 is established, the excitation on the electro-magnet will be maintained although that contact is broken, which will happen on the part 159 being called back to its normal position by means of a spring. This excitation will cease when the switch 167 is open. Switch 167 is opened by the actuation of the re-setting bar 133. It is seen that the aggregate of this device allows dividing the time by 10, that is, that instead of the interval of 10 minutes that was assumed necessary in the example to select a card, there shall be a period of time of only one minute.

However, this interval may still be excessive. This time can be shortened by providing instead of one sensing or critical zone, together with the small previously described sensing means associated therewith, a plurality of zones and sensing means.

To use several selectors or sensing zones at the same time would require some modifications which are now described.

The bars 81 which fix the positions of the spring 8 when the key is sunk no longer would act directly on the spring but would fix the position of a curved bar 171 (see Fig. 26), concentric with the disk by means of the action of a stud 172, that is rigidly positioned to the selection bar 81 since the bar 171 can slide in a way to keep its geometric axis as its rotation axis and the stud 172 goes in a slot that is formed in this bar and which forms an angle with the respective radii of the bar. Each group of selectors has a set of slots in the bars 171 of which bars there are as many as there are figures that are desired to be chosen with the help of the selectors. Because of the displacement of the bar 81 and the consequent displacement of the bar 171, each spring 8, in each sensing zone, will be positioned precisely in the same coding zone as is the corresponding spring 8 in each other sensing zone.

Another necessary modification is the substitution of the system of operating and retention of the card elevators 59, a system that, although adequate for a single group of selectors, would be very complicated if there were several. The new system (see Fig. 27) consists in the presence of two systems of bed-plates 173 which are concentric with the turning axis of the disk and therefore concentric with the bars 171, the systems of bed-plates being operated by a reciprocating motion caused by an eccentric whose stud 226 slides in slot 174, the reciprocating motion of the bed-plates having as a center of rotation the center of the disk. The section of the bed-plates is that indicated in Fig. 28, the elevators resting on the projections 175 which the bed-plates have. In the reciprocating motion the projections 175 will push the elevator upwards and then will allow it to descend.

The elevator 59' as can be seen no longer is a simple part but consists of two telescopic parts which are joined by a spring 176 whose tension is sufficient to raise the card to the desired height but is overcome when the movement of the upper part of the elevator is obstructed by the hook 177 of the bolt. This hook, which substitutes the obstruction imposed by the bolt 100 and the bolt corresponding to the electro-magnet of the circuit 166, prevents the elevator from operating the cards, while the sector corresponding to the desired thousand is sought or while, after the card has been found, actions leading to its ejection are carried out. A curved part similar to that in Fig. 26, acted upon by the studs which have already been mentioned, can obstruct the operating of the elevators. It is obvious that the new elevators should be suitably guided.

Figure 29:
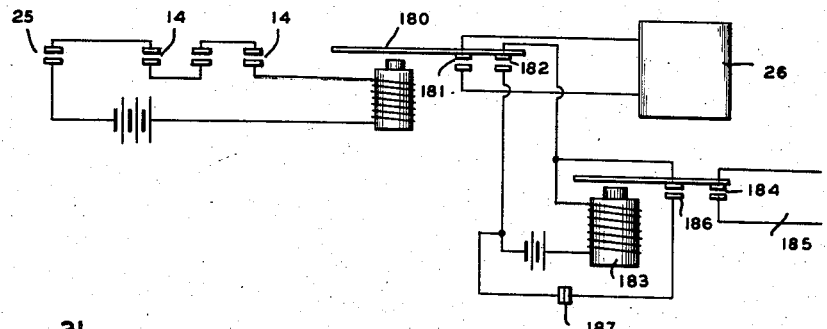
Fig. 29 is a diagram of the electrical circuit when plural sensing means are utilized.

Another necessary modification is that of the extractor system since only that one which corresponds to the selector which has found the card that was sought should operate, for otherwise it would create a confusion that would be a disadvantage. This is obtained (see Fig. 30), by causing the bar 133 to act on another curved bar 178 by means of a combination of stud 188 and slot 189 which cause an angular displacement 190 when the bar 133 is operated. The inclined planes 179 with respect to the displacement would push outwards the studs 149 of the respective extractors. To see to it that only the right extractor acts, the circuit of Fig. 12 is substituted by the one represented in Fig. 29, a double contact relay 180 being inserted. One of the contacts 181 serves as excitation to the relay 26 whereas the other 182 excites a second relay 183 which also has a double contact, which on operating will close the circuit 184 of an electromagnet 185, which is not shown in this figure, whereas the contact 186 will keep the relay excited even when the contact 182 is open. In this last circuit an additional contact 187 has been set up to be opened by the re-setting bar 133 for the purpose of setting the circuit for a new operation.

Figure 30:
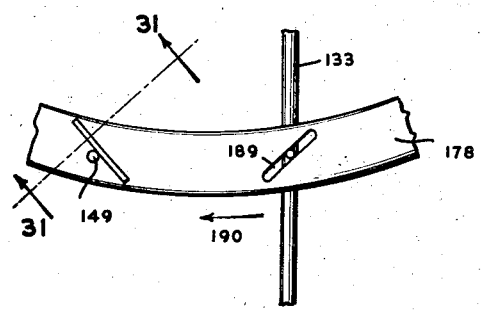
Fig. 30 is a diagrammatic plan view of a detail of the actuating means for the extractors when plural extractors are used.
Figure 31:
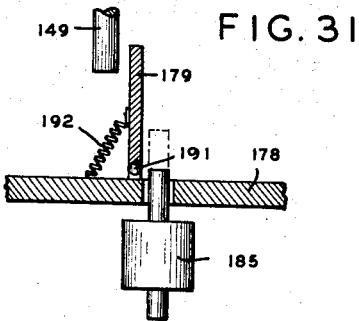
Fig. 31 is a diagrammatic sectional view on the line 31—31 of Fig. 30.

The function of the electro-magnet 185 is the following, the section along the line 31—31 of Fig. 30 being represented in Fig. 31. In these drawings there is stud 149 of an extractor and the plane 179 that is to push it. But said plane is joined to the bar 178 by means of the hinge 191 and fastened in a position perpendicular to said bar by means of the pull of the spring 192. The tension of this spring is not sufficient to move the extractor, because of which, on the bar being displaced, the planes 179 will turn over, the only exception being the plane that corresponds to the selector or sensing means in which the card is being sought is located. This latter selector will have caused the corresponding electro-magnet 185 to act which will have projected its card in the way indicated by the dotted lines, thereby giving the plane 179 a firm support which will allow it to overcome the resistance of the extractor.

It is evident that it will be necessary that the action which has been described individually for each group of selectors be repeated in all the groups of selectors which will be done through the multiplying of the simple actions with the aid of curved bars which are displaced around the geometric center of the disk. The coordination of the effects of these actions will also be necessary, as for example: the turning of the part 114 must be effected so that the contact 25 is open before the bar 118 lowers the ends of the springs 8 sufficiently as for the contacts 14 to be re-established. This will prevent the operation of the circuits of the figure in the selectors which have not found the card that is desired.

Additionally, there is provided for the return of the cards after their use a sector-finder corresponding to thousands exactly similar to the one described, that faces the chosen sector with the re-admission inlet similar to the one already indicated.

Additionally, different elements could be added which without being indispensable could simplify the operation. As an example, two of these elements are hereinafter described.

If for any reason the card which was being sought were not inside the file, it would be necessary to set up a system to stop operations so as to avoid indefinite searching for the card. This can be brought about very easily by means of a double position switch similar to the system which was formed for the rod 159 so that on occupying the second position the switch can stop the apparatus and eventually to control a signal so as to warn about the anomaly.

Figure 32:
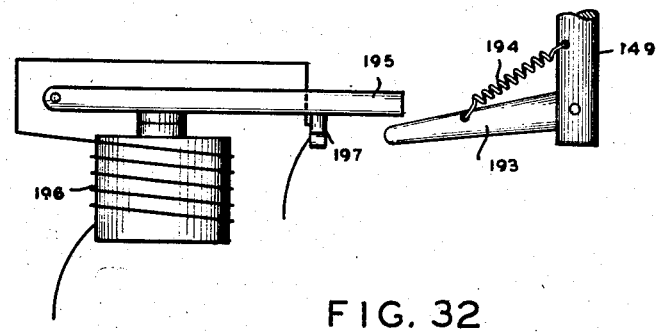
Fig. 32 is a diagrammatic sectional detail of a modification of the ejecting means to prevent operation of the file when a card has not been removed from the ejector by the operator.

A problem presents itself in the possible fact that, a card being in a position to be withdrawn, a new operation is started, without having withdrawn said card. It is easy to see that under these conditions a serious accident could come about. A simple device, which will permit such an eventuality to be avoided, is the device represented in Fig. 32. In the end of the stud 149 a pivoted arm 193 is affixed. This arm is kept in position by means of the spring 194. On the extractor being displaced, the arm 193 will put pressure on the end of the lever 195 which it will not be able to lift because of the action of the electro-magnet 191 on it is greater than the action of the spring 194, since the electro-magnet is fed by the same circuit which energizes the main motor. Once the operation is ended and the feed from the motor is cut, the spring 194 will overcome the mechanical resistance and will lift the lever 195 separating the contacts of the switch 197. Consequently the feed circuit from the motor will remain open and it will not close until, because of the card having been withdrawn, the extractor returns to its initial operating position. At that time the arm 193 will be withdrawn and the lever 195 will fall thus closing the circuit.

Another problem is that of an error on signaling an operation. Although for the system which has been described it will be sufficient to press the correct key after an error has been made in order to correct it, there may be interest in having a key available to efface everything which has been marked in case of an error. This will be done very easily in the light of what has been described by having the effacing key act on an eccentric which presses the ends of the bar 73 so that what has been marked can be completely effaced.

I claim:

1. An automatic card file for selection and extraction of coded cards radially arranged on an annular support comprising an annular member for supporting the cards, means to rotate said member relative to a sensing zone, sensing means for sensing a code means on a card in the sensing zone, selecting means to selectively adjust the sensing means to sense and recognize a preselected code in the code means of the card, and means for ejecting, from the file, a card having the preselected code.

2. An automatic card file as recited in claim 1 which includes means for lifting a card at the sensing zone from a low elevation to a higher elevation and returning said card to the lower elevation after it has passed the sensing zone.

3. An automatic card file as recited in claim 2 which includes means for preventing lifting of a card at the sensing zone when said card carries the preselected code.

4. An automatic card file as recited in claim 3 wherein the means for preventing lifting is actuated by the sensing means.

5. An automatic card file as recited in claim 4 wherein the means for ejecting is actuated by the sensing means.

6. An automatic card file as recited in claim 2 including means for stopping the movement of each card in the sensing zone as it enters said zone, said movement of the card being in the plane of relative motion between the supporting member and the sensing zone, said means stopping the movement of the card prior to the actuation of the means for lifting the card.

7. An automatic card file as recited in claim 1 wherein the code means of a single card is sensed at any one time.

8. An automatic card file as recited in claim 1 wherein said relative movement is actuated by the selecting means and said movement is stopped upon ejection of a card carrying the preselected code.

9. An automatic card file as recited in claim 1 wherein the sensing means includes an arcuate resilient means supporting a sensing member.

10. An automatic card file as recited in claim 9 wherein the selecting means includes means to radially move the sensing member to a position to sense a predetermined zone in the cards.

11. An automatic card file as recited in claim 10 wherein the selecting means includes a keyboard and means linking the keyboard and the sensing means.

12. An automatic card file as recited in claim 11 including means for lifting a card at the sensing zone from a low elevation to a higher elevation and returning said card to the lower elevation after it has passed the sensing zone.

13. An automatic card file as recited in claim 12 which includes means for preventing lifting of a card at the sensing zone when said card carries the preselected code.

14. An automatic card file as recited in claim 13 wherein the means for preventing lifting is actuated by the sensing means.

15. An automatic card file as recited in claim 1 wherein the annular support comprises a disk surrounded by a plurality of spaced, concentric, supporting members.

16. An automatic card file as recited in claim 15 wherein the sensing zone is positioned between the spaced, concentric, supporting members.

17. An automatic card file as recited in claim 16 wherein the spaced, concentric members are displaced from their plane at the sensing zone to provide means to prevent movement of the cards, in the plane of the supporting members, as the cards enter the sensing zone.

18. An automatic card file as recited in claim 17 which includes means for lifting a card at the sensing zone from a low elevation to a higher elevation and returning said card to the lower elevation after it has passed the sensing zone.

19. An automatic card file as recited in claim 18 which includes means for preventing lifting of a card at the sensing zone when said card carries the preselected code.

20. An automatic card file as recited in claim 19 wherein the means for preventing lifting is actuated by the sensing means.

21. An automatic card file for selection and extraction of coded cards radially arranged on an annular support comprising a plurality of cards, each card having coding means, an annular member supporting the cards, each card being supported vertically, means to rotate said annular member relative to a sensing zone, sensing means for sensing a code means on a card in the sensing zone, selecting means to selectively adjust the sensing means to sense and recognize a preselected code in the code means of the card, and means for ejecting, from the file, a card having the preselected code.

22. An automatic card file as recited in claim 21 wherein the code means on each card includes a plurality of coding zones, each zone having a tooth-like extension therein, the location of said extension in the zone determining the code of the card.

23. An automatic card file as recited in claim 22 wherein the cards are supported by a disk with the code means radially overhanging the edge of the disk.

24. An automatic card file as recited in claim 23 which includes means for lifting a card at the sensing zone from a low elevation to a higher elevation and returning said card to the lower elevation after it has passed the sensing zone.

25. An automatic card file as recited in claim 24 including means actuated by the sensing means for preventing lifting of a card at the sensing zone when said card carries a preselected code.

26. An automatic card file as recited in claim 25 wherein the sensing means comprises an arcuate resilient member supporting a sensing member, there being a plurality of sensing members, one for each coding zone.

27. An automatic card file as recited in claim 26 wherein the selecting means includes means to move each arcuate resilient means to a location within the coding zone, said location corresponding to the preselected code for the card to be extracted from the file.

28. An automatic card file for selection and extraction of coded cards radially arranged on an annular support comprising a plurality of cards, each card having code means thereon, said code means including a plurality of coding zones, each zone having a tooth-like extension to be sensed by the sensing means, the cards being supported vertically on a disk with the code means radially overhanging the edge of the disk, the code means being further supported by a plurality of spaced, concentric, supporting members surrounding the disk, a sensing means positioned between the spaced, concentric, supporting members, the disk being rotatable on its axis to move the cards past a sensing zone, a sensing means being located in the sensing zone, said sensing means comprising a plurality of arcuate resilient means each supporting a sensing member comprising a stud, selecting means to selectively radially adjust the sensing means in order to position the stud in the area of the coding zone in accordance with the preselected code, the tooth-like extensions, when positioned on a card having the preselected code, pressing against the stud to thereby move the arcuate resilient means, the arcuate resilient means when moved closing a switch means which actuates a means to eject the selected card from the file, means for lifting a card at the sensing zone from a low elevation to a higher elevation and returning said card to the lower elevation after it has passed the sensing zone, means for preventing lifting of a card at the sensing zone when said card carries the preselected code, said means for preventing lifting of the card being actuated by means which is actuated by the closing of said switch means, said switch means also actuating means which re-set the file and the means associated therewith to a position for selecting another card.

29. An automatic card file as recited in claim 1 including a plurality of sensing zones, a plurality of sensing means, one for each sensing zone and a plurality of ejecting means, one for each sensing zone, said sensing zones being circumferentially spaced around said annular support.

30. An automatic card file as recited in claim 1 including a plurality of code means on the annular support, means for sensing said code means on said support, means for preventing the functioning of the sensing means for sensing the code means on a card, said latter prevention means functioning until a preselected code means on the disk has been sensed.

31. An automatic card file as recited in claim 21 including means to stop the relative movement when all the cards in the file have passed through the sensing zone and no card has been ejected.

32. An automatic card file as recited in claim 1 including means to prevent relative movement between the annular member and the sensing zone when there is interference with the movement.

33. An automatic card file as recited in claim 21 wherein each card has a tooth-like projection, said projection being the means by which the ejecting means removes the card from the file.

34. An automatic card file as recited in claim 1 wherein the ejecting means remains in its ejecting position until the preselected card has been removed from the file.

References Cited in the file of this patent
UNITED STATES PATENTS

| | | |
|---|---|---|
| 2,270,896 | Rippon | Jan. 27, 1942 |
| 2,345,858 | Nevin | Apr. 4, 1944 |
| 2,635,769 | Mishey | Apr. 21, 1953 |